Jan. 28, 1930.  R. T. WISE  1,745,075
THREE-SPEED TRANSMISSION
Filed June 6, 1928
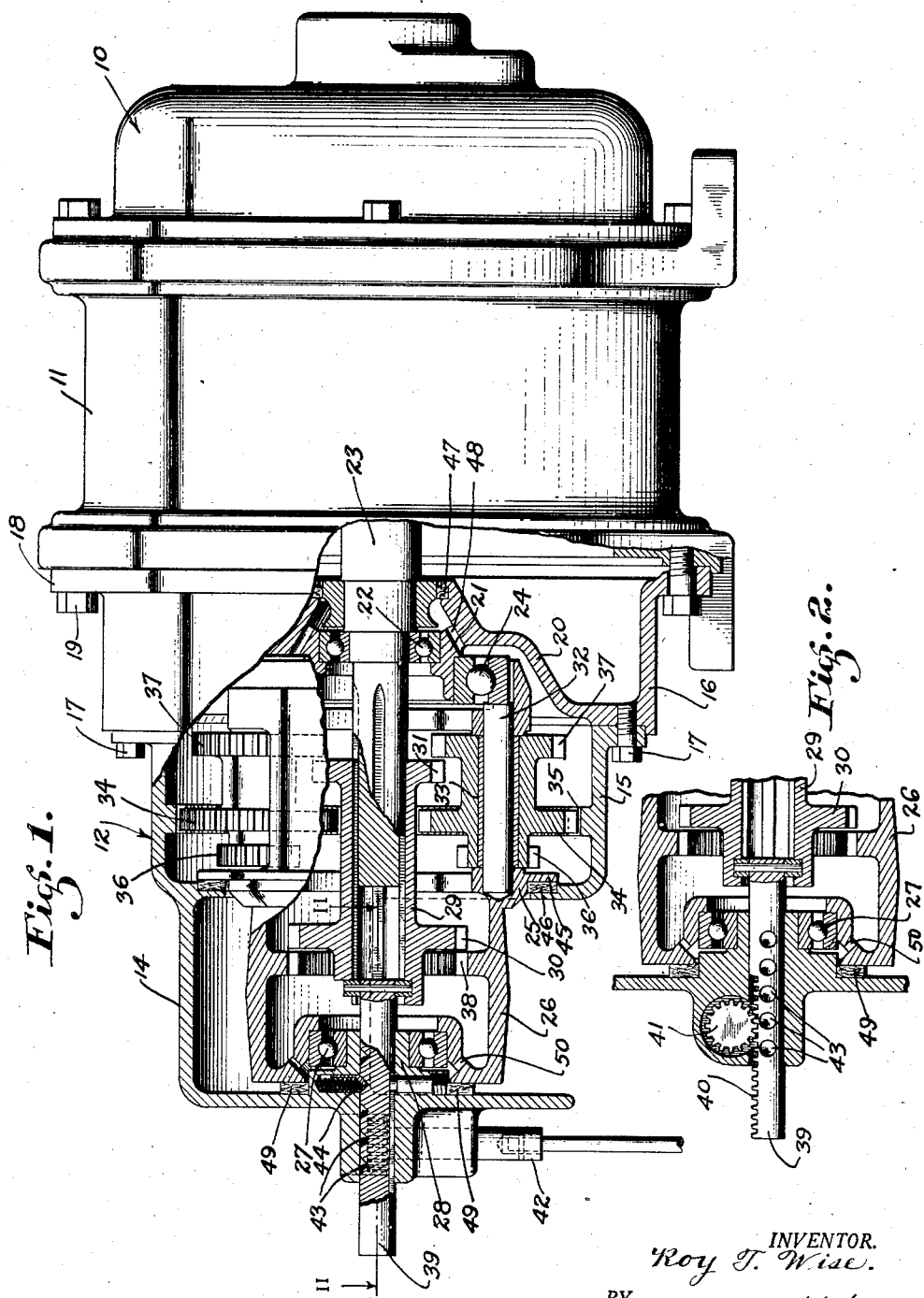
INVENTOR.
Roy T. Wise.
BY
Townsend, Loftus & Abbett
ATTORNEYS.

Patented Jan. 28, 1930

1,745,075

UNITED STATES PATENT OFFICE

ROY T. WISE, OF BERKELEY, CALIFORNIA, ASSIGNOR TO STANDARD DIE AND TOOL COMPANY, INCORPORATED, OF BERKELEY, CALIFORNIA, A CORPORATION OF CALIFORNIA

THREE-SPEED TRANSMISSION

Application filed June 6, 1928. Serial No. 283,249.

This invention relates to transmissions and particularly pertains to a variable speed transmission for electric motors.

It is the principal object of the present invention to generally improve the construction and operation of transmissions of the character referred to by providing a transmission which may be directly assembled on the frame of a motor, and wherein a plurality of transmission gears are compactly arranged and capable of selective operation to drive the driving element of the transmission at different speeds while the speed of the motor remains constant.

In carrying out the invention into practice, I provide a transmission including a casing adapted to be connected with the frame of an electric motor in lieu of the usual end plate at the drive end of the motor. A plurality of sliding gears are splined on the motor shaft and capable of operation to place them in mesh with planet gears engaging a stationary ring gear, which planet gears are carried by a revolving driving element. The sliding gears are also adapted to be rigidly connected to the driving element so as to form a direct drive connection between the driving element and the motor shaft.

One form which the invention may assume is exemplified in the following description and illustrated by way of example in the accompanying drawings, in which:

Fig. 1 is a central longitudinal section through a transmission embodying the preferred form of my invention and disclosing it as assembled on an electric motor of a standard type.

Fig. 2 is a fragmentary view in plan section taken on line II—II of Fig. 1.

Referring more particularly to the accompanying drawings, 10 indicates an electric motor having the usual frame 11 to which my improved transmission 12 is rigidly connected. The present transmission is adapted to be utilized in connection with motors of standard design without altering the construction of the latter, except by the removal of one end plate of the motor.

The transmission mechanism 12 is formed with a casing 14 which is substantially cylindrical. This casing 14 is formed in two sections 15 and 16 which are rigidly connected by means of cap screws 17. At its inner end the section 16 of the casing 14 is formed with a radially circumscribing flange 18 adapted to be connected to the motor frame 11 by means of cap screws 19 or other suitable connecting elements.

The section 16 of the casing 14 is formed with a radial web 20 having a central trunnion 21. The bore of this trunnion receives an anti-friction bearing 22 embracing the motor shaft 23. The exterior surface of the trunnion 21 is turned to receive an anti-friction bearing 24 carrying a spider 25 formed as an integral part of a pulley 26. The spider 25 is disposed concentrically of the motor shaft 23 within the cylindrical portion of the casing 14, while the pulley 26 is arranged exteriorly of the cylindrical portion but is housed within a portion of the casing 14, projecting beyond the cylindrical portion thereof. The part of the casing enclosing the pulley 26 is open at one side so that a belt may be arranged over the pulley to connect the latter with the machine to be driven.

As previously stated, the pulley with its integrally formed spider has a bearing at one end as at 24. At its opposite end the pulley has a bearing 27 on a trunnion 28 projecting inwardly from the outer end of the housing. These bearings 24 and 27 align the pulley and its spider 25 with the motor shaft 23. This motor shaft 23 projects within the spider 25 and a sleeve 29 is splined thereon. At one end of this sleeve, it is formed with a gear 30 and at its opposite end it is formed with a second gear 31 which gears are of different diameters.

Carried by the spider at diametrically opposite sides of the motor shaft is a pair of spindles 32 carrying planet units 33. Each planet unit comprises a central gear 34 in mesh with an internal ring gear 35 formed as an integral part of or rigidly fixed to the transmission casing 14. Each planet unit also comprises a pinion 36 and a gear 37 arranged at opposite sides of the central gear 34.

It is intended that the pulley 26 be driven at three different speeds while the motor speed remains constant. One speed is a direct drive driving the pulley at the same speed as the motor shaft. This is accomplished by providing the pulley 26 with an internal gear 38 which is adapted to mesh with the gear 30 on the sleeve 29. Meshing of the gear 30 on the sleeve 29 with the internal gear 38 on the pulley will act to clutch the pulley to the motor shaft and drive the same at the same speed as the motor shaft.

By shifting the sleeve 29 axially on the motor shaft, the gear 31 may be placed in mesh with the gears 37 of the planet units, thereby driving the planet units and causing their gears 34 to travel around the internal ring gear 35, driving the spider and its connected pulley 26 in the same direction as the motor shaft but at a relatively different rate of speed.

Likewise the sleeve 29 may be shifted to place the gear 30 thereon in mesh with the pinions 36 of the planet units, so as to drive the latter at a rate of speed different than it will be driven when the gears 31 and 37 are in mesh. It is obvious that when the planet units are driven they will ride around the internal ring gear 35 and drive the spider and its connected pulley 26 in the same direction as the motor shaft but at a relatively different rate of speed.

To shift the sleeve 29 I have connected the sleeve with a control shaft 39 extending through the trunnion 28. The connection between the control shaft 39 and the sleeve 29 is such that the latter may rotate relative to the control shaft 39. The control shaft, however, is held from rotation. To operate the control shaft, it is formed with rack teeth 40 in mesh with a pinion 41 carried by the casing 14. This pinion 41 is fitted with a shaft 42 which may be revolved by any suitable means such as a crank to reciprocate the control shaft.

The upper face of the control shaft is provided with a plurality of sockets 43 adapted to be engaged by a spring-pressed member 44 within the trunnion 28. These sockets are so spaced apart that each engagement thereof by the spring-pressed member 44 will indicate one position of the sleeve 29. Therefore, such engagement will yieldingly maintain the gears on the sleeve 29 in mesh with a selected gear or in a neutral position when they are so positioned by operation of the shaft 39.

I intend that the gears be run in lubricant so as to minimize wear and chattering. For this purpose at a point intermediate the spider and the pulley 26, the spider is formed with an outwardly projecting flange 45 which is of a greater diameter than the diameter of the opening at the outer end of the cylindrical portion of the transmission casing 14. Intermediate this flange and the outer wall of the cylindrical portion of the casing I provide a felt ring 46 to form an oil tight joint and prevent lubricant from escaping outwardly from the cylindrical portion of the casing around the spider. At the inner end of the transmission I provide a felt ring 47 to prevent the lubricant from escaping along the motor shaft. Lubricant passing through the bearing 22 may escape back into the cylindrical portion of the casing through a passageway 48 extending through the trunnion 21.

As the pulley 26 is hollow it communicates with the interior of the cylindrical portion of the casing, so that the lubricant in the latter may enter within the pulley and lubricate its bearing and also the gears 46 and 38. Around the trunnion 28, I arrange a felt washer 49 interposed between the end of the pulley and the end of the transmission casing about the trunnion 28. Any lubricant passing through the bearing 22 may discharge back into the interior of the pulley through the medium of passageways 50.

It is obvious from the foregoing that all of the wearing surfaces of the present device will be fully exposed to a lubricant and thus wear will be minimized and chattering of the gears eliminated.

In operation of the device, if it is desired to directly connect the pulley to the motor shaft so that the former will drive at the same speed as the motor, the sleeve 29 is shifted outwardly to place the gear 30 in mesh with the internal gear 38. This will effectively clutch the pulley 26 and its spider 25 to the motor shaft and drive the pulley in unison with the motor shaft. The planet gears will then idly travel around the ring gear 35.

When it is desired to drive the pulley at a rate of speed different than that of the motor, the sleeve 29 is shifted inwardly to place the gear 31 in engagement with the gears 37 of the planet units. As the sleeve 29 is splined on the motor shaft 23, the gears 37 will revolve with the motor shaft and drive the planet units. As these planet units have gears 34 in mesh with the stationary internal ring gear 35, the planet units when driven will drive around the internal ring gear, revolving the pulley 26 and the spider 25 in the same direction as the motor shaft but at a relatively different rate of speed.

A third speed may be obtained by shifting the gear 30 on the sleeve 29 into mesh with the pinions 36 on the planet units. This will drive the planet units and through their gears 34 and the internal ring gear 35 revolve the pulley and its spider 25 around the motor shaft in the same direction as the motor shaft but at a relatively different rate of speed.

From the foregoing it is obvious that I have provided a compact and efficient transmission for electric motors wherein the pulley or driving element of the transmission may be driven at three different speeds while maintaining the motor speed constant. As the wearing parts of the transmission are all run in lubricant but a minimum of wear will result.

It is obvious that additional speeds may be provided by merely increasing the number of gears on the sleeve 29 and the number of gears on the planet units, and although I have shown but three speeds in the present transmission it is obvious that a greater number of speeds may be obtained by merely altering the design of the transmission here disclosed by the addition of additional gears.

While I have shown the preferred form of my invention, it is to be understood that various changes may be made in its construction by those skilled in the art without departing from the spirit of the invention, as defined in the appended claims.

Having thus described my invention, what I claim and desire to secure by Letters Patent is:

1. A motor transmission including a transmission casing, a power shaft extending into the casing, a revoluble driving element carried by the casing and concentric with the power shaft, a planet gear carried by the driving element, a stationary internal gear meshing with the planet gear, gears of different diameters rigidly fixed to the planet gear, gears of different diameters splined on the power shaft, and means for placing a selected gear on the power shaft in mesh with a selected gear of the planet gear.

2. A motor transmission including a transmission casing, a power shaft extending into the transmission casing, a driving element arranged within the said casing concentric with the power shaft, a stationary internal gear, a planet gear carried by the driving element and meshing with the internal gear, gears slidably but non-rotatably mounted on the power shaft, gears relatively fixed to the planet gear, and means for sliding said gears on the power shaft into and out of mesh with the gears of the planet gear, whereby a selected gear may be placed in mesh with a selected gear rigid with the planet gear.

3. A motor transmission including a transmission casing, a power shaft extending into the casing, a driving element arranged within the transmission casing concentric with the power shaft, a stationary internal gear, a planet gear carried by the driving element and meshing with the internal gear, gears slidably but non-rotatably mounted on the power shaft, gears rigid with the planet gear, means for sliding said gears with the power shaft into and out of mesh with the gears of the planet gear, whereby a selected sliding gear may be placed in mesh with a selected gear of the planet gear, and means for directly connecting said driving element with the power shaft.

4. A motor transmission including a transmission casing, a power shaft extending into the casing, a member splined on the power shaft, a driving element mounted concentrically of the power shaft, means for connecting said driving element to said member to prevent relative rotation therebetween, a stationary internal gear, a planet gear carried by the driving element in mesh with said internal gear, a gear rigid with the planet gear, a gear fixed to said member, and means for operating said member to connect it either to the driving element or to place the gear thereon in mesh with the gear fixed to the planet gear.

5. A motor transmission comprising a transmission casing, a power shaft extending into the transmission casing, a driving element arranged within the casing concentrically of the power shaft, a member splined on the power shaft, a planet gear carried by the driving element, a stationary internal gear meshing with the planet gear, gears of different diameters fixed to said member, gears of different diameters fixed to said planet gear, and means for reciprocating said member along the power shaft to place a selected gear on the member in mesh with a selected gear fixed to the planet gear.

6. A motor transmission comprising a transmission casing, a power shaft extending into the said casing, a driving element arranged within the casing concentrically of the power shaft, a member splined on the power shaft, a planet gear carried by the driving element, a stationary internal gear meshing with the planet gear, gears of different diameters fixed to said member, gears of different diameters fixed to said planet gear, means for reciprocating said member along a power shaft to place a selected gear of the member in mesh with a selected gear fixed to the planet gear, and an internal gear fixed to the driving element and of the same diameter as one of the said gears on said member, said member being capable of being shifted to place its gear in mesh with said internal gear and thereby connect said member to said driving element.

7. A motor transmission comprising a transmission casing, a power shaft extending into the transmission casing, a trunnion at one end of the casing in which said power shaft is jouraled, a driving element mounted within the casing concentrically with the power shaft and having a bearing at one end on said trunnion and at its opposite end on said casing, a member arranged within the driving element and splined on the power shaft, gears of different diameters fixed to said member, a stationary internal gear, a planet gear carried by the driving element and meshing with the internal gear, gears of different diameters fixed to the planet gear, means for sliding said member on the power shaft to place a selected gear thereon in mesh with a selected gear fixed to the planet gear, an internal gear fixed to the driving element and arranged concentric with the power shaft and capable of being placed in mesh with the gear of equal diameter on said member to directly connect said driving element to the motor shaft.

ROY T. WISE.